United States Patent [19]

Ikeda et al.

[11] Patent Number: 5,221,472
[45] Date of Patent: Jun. 22, 1993

[54] VACUUM FILTRATION APPARATUS WITH HORIZONTAL FILTER-LIKE CONVEYOR

[75] Inventors: Michio Ikeda; Kazuo Kamezaki; Yoshihiko Nakazawa; Shuji Iwasaki; Masuhiro Sato; Minoru Morita, all of Tokyo, Japan

[73] Assignee: Tsukishima Kikai Co., Ltd., Tokyo, Japan

[21] Appl. No.: 714,454

[22] Filed: Jun. 13, 1991

[51] Int. Cl.⁵ .................................. B01D 33/70
[52] U.S. Cl. .................................. 210/389; 210/391; 210/400; 210/406
[58] Field of Search ............... 210/391, 389, 400, 401, 210/406, 783; 100/151, DIG. 3; 198/832.1

[56] References Cited

U.S. PATENT DOCUMENTS

| | | | |
|---|---|---|---|
| 2,529,777 | 11/1950 | McInnis | 198/832.1 |
| 3,513,974 | 5/1970 | Markwick | 210/106 |
| 4,038,193 | 7/1977 | Oosten | 210/400 |
| 4,127,487 | 11/1978 | Havalda | 210/401 |
| 4,420,402 | 12/1983 | Bolton et al. | 210/401 |
| 4,673,514 | 6/1987 | Casey et al. | 210/401 |
| 4,836,100 | 6/1989 | Johnson et al. | 210/386 |
| 4,851,113 | 7/1989 | Evans | 210/400 |
| 4,908,136 | 3/1990 | Chou et al. | 210/400 |
| 5,112,485 | 5/1992 | Hirs | 210/400 |

OTHER PUBLICATIONS

English Transcript of JP-A-114616.

Primary Examiner—Peter Hruskoci
Assistant Examiner—Robert James Popovics
Attorney, Agent, or Firm—Kane, Dalsimer, Sullivan, Kurucz, Levy, Eisele and Richard

[57] ABSTRACT

A vacuum filtration apparatus is provided with one or more vacuum chambers fixedly secured at predetermined positions. The interior of the vacuum chamber alternates between a partial vacuum and atmospheric pressure. An endless filter belt has a horizontal section disposed above the vacuum chamber. A slurry is fed from one or more slurry feeders onto the horizontal section of the endless filter belt so as to create a cake of solid particles. Water is fed from one or more water feeders onto the cake to wash the solid particles on the endless filter belt. The endless filter belt intermittently advances by a predetermined length. When the endless filter belt is stopped, the vacuum chamber is under a vacuum so as to draw the liquid constituent from the slurry, thereby obtaining a purified cake of the solid particles. The vacuum filtration apparatus is provided with a coupling bar at which the slurry feeder and the water feeder is attached. The coupling bar can reciprocate along the endless filter belt by the length of the intermittent advancement of the endless belt. Preferably, the coupling bar is connected to a belt advancing device so that the advancement of the endless filter belt causes movement of the slurry feeder and the water feeder in the direction which is the reverse of the direction of advancement of the endless filter belt.

7 Claims, 8 Drawing Sheets

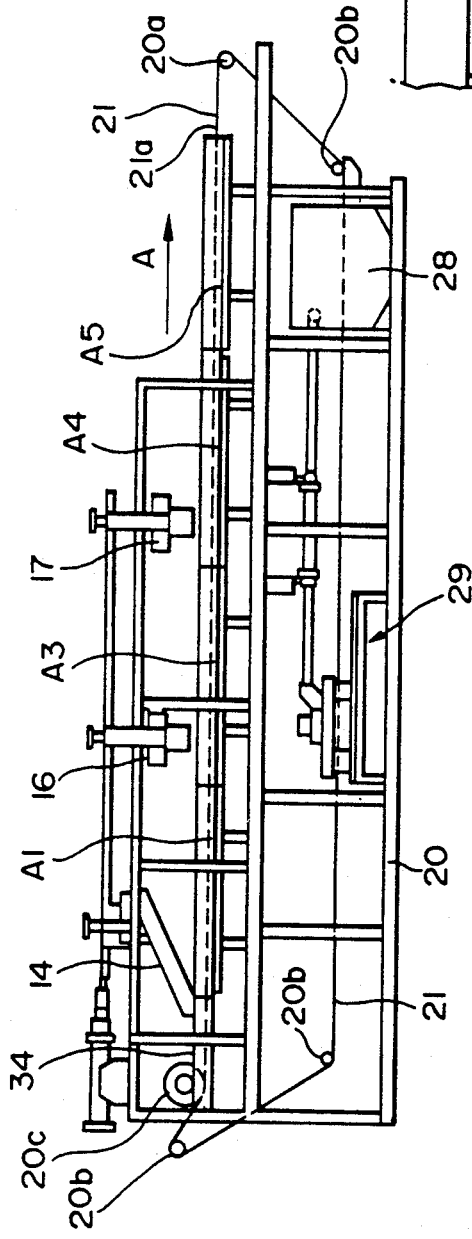
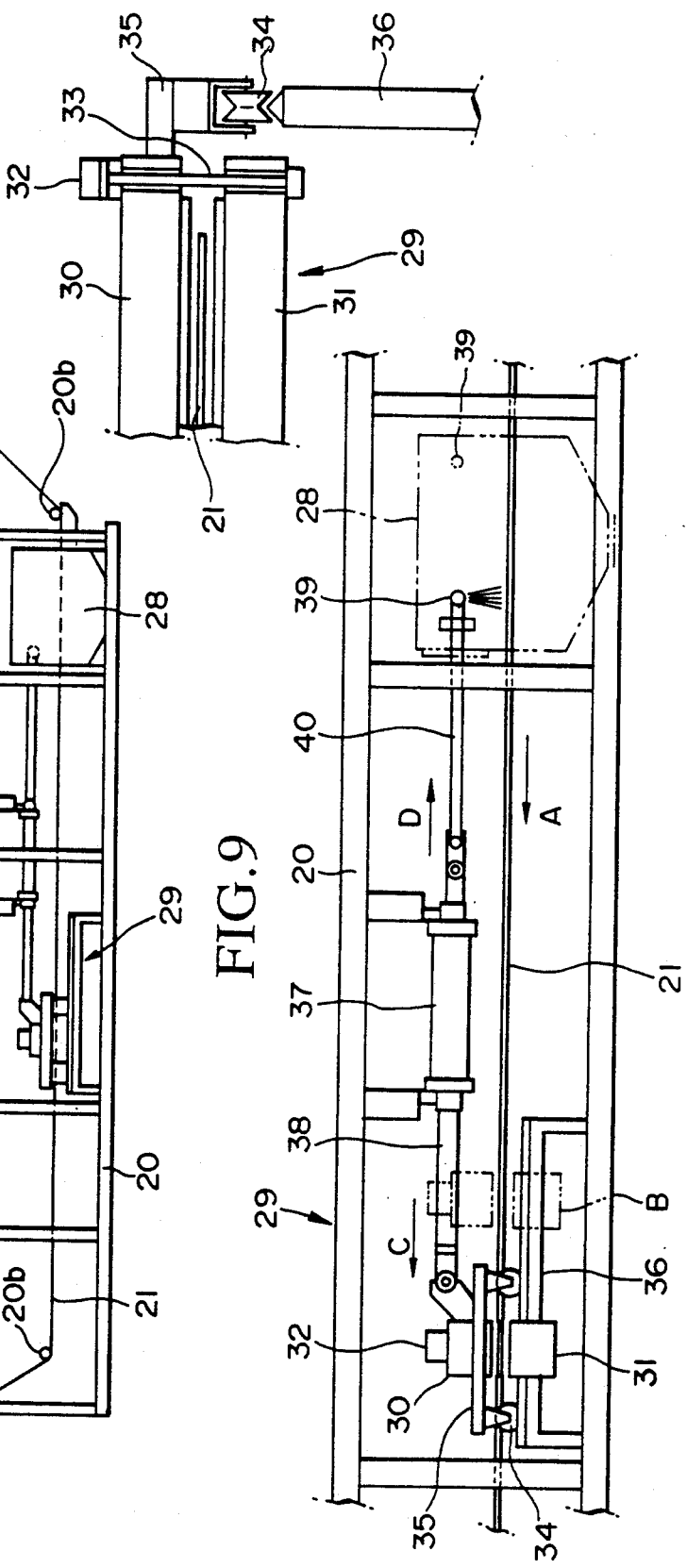
FIG. 8
FIG. 9
FIG. 10

VACUUM FILTRATION APPARATUS WITH HORIZONTAL FILTER-LIKE CONVEYOR

BACKGROUND OF THE INVENTION

The present invention relates to vacuum filtration apparatuses with horizontal filter-like conveyors for the filtration of various type of slurries (insoluble solid particles suspended in a liquid) used in, e.g., inorganic chemical processes, organic chemical processes, food processing, mining extraction, or waste treatment processes. In particular, the present invention relates to a vacuum filtrating apparatus for filtering slurries of water and relatively large particles between 20 and 1000 $\mu$m in diameter.

Conventionally, vacuum filtrating apparatuses such as those mentioned above are categorized into one of two types. One type continuously draws water from a slurry by means of one or more vacuum chambers. The other type intermittently draws water from a slurry by means of one or more vacuum chambers having one or more valves and the like.

The former is further categorized into one of two types. In one type, vacuum chambers are provided under an endless rubber belt. The endless rubber belt is synchronously advanced with an endless filter belt, wherein continuous filtration can be accomplished. In the other type, a large number of vacuum chambers are coupled with a circulating structure like an endless filter belt, whereby continuous filtration can be accomplished. In both these prior arts, by virtue of the continuous filtration, it is advantageous that the slurry be fed constantly and uniformly. However, the constructions and arrangements of the machinery to accomplish this are inevitably complicated, thereby increasing the costs of the apparatus as a whole.

Examples of the latter, that is, the intermittently suction type, are disclosed in GB-A-1416186 and GB-A-1434211. GB-A-1416186 discloses an endless filter belt which circulates continuously in one direction, and a subjacent suction box provided within the path of the endless filter belt. The suction box is temporarily advanced along with the endless filter belt in such a manner that the suction box is disposed under the horizontally advancing section of the endless filter belt. During the advancement of the suction box, the suction box draws water from the slurry which is conveyed by the endless filter belt. Once the suction box arrives at a predetermined point, the suction box is released from the endless filter belt by the introduction of air by means of the switching of a valve, and the suction box is then quickly returned to the initial point. In this art, by virtue of the continuous advancement of the endless filter belt, it is also advantageous that slurry be fed constantly and uniformly. However, in order to alter the internal pressure of the suction box from sub-atmospheric pressure to atmospheric pressure, and in order to quickly return the suction box to the initial point, the constructions and arrangements of the machinery are again inevitably complicated, thereby increasing the costs of the apparatus as a whole.

GB-A-1434211 discloses an endless filter belt which circulates intermittently in one direction, and a plurality of vacuum trays fixedly secured under the horizontally advancing section of the endless filter belt in such a manner that the endless filter belt can advance over the vacuum trays. The endless filter belt advances and stops intermittently. When the endless filter belt stops, the vacuum trays turn to be evacuated so as to draw water from the slurry conveyed by the endless filter belt. After a certain duration, the interior pressure of the vacuum trays is converted to atmospheric pressure, thereby stopping the suction. This process is repeated so that the slurry is progressively filtered.

In the art of GB-A-1434211, the constructions and arrangements of the machinery is simple, and the cost of the apparatus is therefore less in comparison with the preceding prior arts. However, since the endless filter belt advances intermittently and slurry is fed from a fixed position, the slurry is not uniformly distributed on the endless filter belt. Accordingly, the filtration of the slurry is not uniform. Additionally, the cake of particles formed on the endless filter belt as a result of the filtration of the slurry is formed variably on the endless filter belt so that the washing of the cake on the endless filter belt cannot be performed efficiently. In addition, since the endless filter belt advances intermittently, the switching of the valve mechanisms and the like for the vacuum trays, for the slurry supply, and for the washing water, are elaborate, and the service life of the valve mechanisms and the like is shortened. Furthermore, in order to prevent the reverse movement of the endless filter belt during intermittent advance, a special mechanism is required. Moreover, when washing the cake on the endless filter belt, if the washing water is supplied to the endless filter belt continuously, some portion of the water must be wasted since the endless filter belt presents cakes to the washing water only intermittently.

In order to solve the above problems, a vacuum filtrating apparatus and a method therefor, disclosed in JP-A-62-114616, were proposed by one of the present inventors. In this art, an endless filter belt intermittently advances and a slurry is fed from a feeder, which can reciprocate, onto the endless filter belt, so that a plurality of layers of caked material of uniform thickness is formed on the endless filter belt.

However, in this structure, the caked material generally does not form a uniform thickness on the endless filter belt because the slurry is fed from a feeder which temporally stops. In practice, the slurry does not usually disperse on the endless filter belt uniformly. In particular, if the filtration rate of the slurry is high, the cake of particles may be thicker in some regions. Therefore, it is difficult to filter water from the slurry uniformly.

Since the cakes thus formed are not of uniform thickness, it is difficult to uniformly wash the particles therein.

Water for washing the cake on the endless filter belt is sprayed as a mist by means of a spray nozzle. In order to avoid the clogging of the spray nozzle, the water must be fresh; secondary water which has already been used for washing the cake and then been filtrated sometimes includes fine solid particles and is unacceptable.

SUMMARY OF THE INVENTION

It is therefore an object of the present invention to provide a vacuum filtration apparatus with a horizontal conveyor in which the above-mentioned problems are solved.

More specifically, it is an object of the present invention to provide a vacuum filtration apparatus in which a uniform slurry layer, and therefore a uniform cake of slurry particles, can be produced, thereby improving the filtration rate and the washing rate of the apparatus, and thereby improving the purity of the cake.

It is another object of the present invention to provide a vacuum filtration apparatus in which an endless filter belt can be reliably advanced intermittently in one direction at a constant pitch without using an anti-reverse mechanism to prevent the backward movement of the endless filter belt.

Another object of the present invention is to prevent undue stress on the endless filter belt, thereby increasing its service life.

It is another object of the present invention to reuse filtrated water for washing the cake of particles.

It is another object of the present invention to provide a cleaning device for cleansing the endless filter belt connected to and thus driven by the belt advancing device, thereby cleansing the endless filter belt uniformly and continuously.

In accordance with one aspect of the present invention, a vacuum filtration apparatus comprises:

at least one vacuum chamber fixedly secured at a predetermined position, the vacuum chamber opening upward, and the interior of the vacuum chamber alternating between a partial vacuum and atmospheric pressure; and an endless filter belt having a generally horizontal section disposed generally horizontally above the vacuum chamber, a mixture of a liquid and solid particles suspended therein being fed onto the generally horizontal section of the endless filter belt, the endless filter belt being able to intermittently advance by a predetermined length, the vacuum chamber being under a vacuum so as to draw the liquid constituent from the mixture on the generally horizontal section of the endless filter belt when the endless filter belt is stopped, whereby the endless filter belt conveys a cake of the solid particles extracted from the mixture, and then a washing liquid being fed onto the cake of the solid particles on the generally horizontal section of the endless filter belt to wash the cake of the solid particles, and then the washing liquid is drawn off by the suction of the vacuum chamber through the endless filter belt, thereby obtaining purified a cake of the solid particles. The vacuum filtration apparatus further comprises:

at least one mixture feeder for feeding the mixture onto the generally horizontal section of the endless filter belt;

at least one washing liquid feeder for feeding the washing liquid onto the cake of the solid particles on the generally horizontal section of the endless filter belt; and a reciprocating means for reciprocating the mixture feeder and the washing liquid feeder along the endless filter belt by the length of the intermittent advancement of the endless filter belt.

Preferably, the vacuum filtration apparatus comprises a first washing liquid feeder and a second washing liquid feeder. The second washing liquid feeder is disposed backward of the first washing liquid feeder in the direction of the movement of the endless filter belt. The second washing liquid feeder feeds a fresh liquid onto the cake of the solid particles for washing the solid particles. The first washing liquid feeder feeds a secondary liquid which has already been utilized for washing the solid particles onto the cake of the solid particles for washing the solid particles.

In another aspect of the present invention, the vacuum filtration apparatus further comprises a belt advancing device which intermittently advances the endless filter belt, the belt advancing device being connected to said reciprocating means for reciprocating the mixture feeder and the washing liquid feeder along the endless filter belt, whereby the mixture feeder and the washing liquid feeder can be reciprocated by a length of the intermittent advancement of the endless filter belt.

Preferably, the belt advancing device holds on to the endless filter belt while the belt advancing device advances the endless filter belt, and the belt advancing device releases the endless filter belt when the endless filter belt is stopped, whereby the mixture feeder and the washing liquid feeder can uniformly feed the slurry or the washing liquid onto the endless filter belt while the endless belt is advanced, and whereby the mixture feeder and the washing liquid feeder can be returned to initial positions from where the feeding of the mixture or the washing water commences when the endless filter belt is stopped.

More preferably, the vacuum filtration apparatus further comprises a cleaning device having at least one spraying means which cleanses the endless filter belt after generally removing the cake of the solid particles from the endless filter belt. The spraying means is driven by the belt advancing device in synchrony with the movement of the endless filter belt, thereby cleansing the endless filter belt uniformly and continuously.

In another aspect of the present invention, a vacuum filtration apparatus comprises:

at least one vacuum chamber fixedly secured at a predetermined position, the vacuum chamber opening upward, and the interior of the vacuum chamber alternating between a partial vacuum and atmospheric pressure; and an endless filter belt having a generally horizontal section disposed generally horizontally above the vacuum chamber, a mixture of a liquid and solid particles suspended therein being fed onto the generally horizontal section of the endless filter belt, the endless filter belt being able to intermittently advance by a predetermined length, the vacuum chamber being under a vacuum so as to draw the liquid constituent from the mixture on the generally horizontal section of the endless filter belt when the endless filter belt is stopped, whereby the endless filter belt conveys a cake of the solid particles extracted from the mixture, and then a washing liquid being fed onto the cake of the solid particles on the generally horizontal section of the endless filter belt to wash the cake of the solid particles, and then the washing liquid being drawn off by the suction of the vacuum chamber through the endless filter belt, thereby obtaining purified a cake of the solid particles. The vacuum filtration apparatus further comprises:

at least one mixture feeder for feeding the mixture onto the generally horizontal section of the endless filter belt;

at least one washing liquid feeder for feeding the washing liquid onto the cake of the solid particles on the generally horizontal section of the endless filter belt; and a belt advancing device which intermittently advances the endless filter belt, and wherein the belt advancing device holds on to the endless filter belt while the belt advancing device advances the endless filter belt, and the belt advancing device releases the endless filter belt when the endless filter belt is stopped.

Preferably, the belt advancing device comprises upper and lower sandwiching members for sandwiching the endless filter belt, and driving means for driving the sandwiching members to reciprocate along the endless filter belt, thereby intermittently advancing the endless filter belt held between the sandwiching members.

BRIEF DESCRIPTION OF THE DRAWINGS

FIG. 8 is a side view of a vacuum filtration apparatus according to a third embodiment of the present invention;

FIG. 9 is an enlarged view of the vacuum filtration apparatus in FIG. 8, showing a belt advancing device;

FIG. 10 is an enlarged front view of the belt advancing device shown in FIG. 9;

DETAILED DESCRIPTION OF THE PREFERRED EMBODIMENTS

With reference to the accompanying drawings, various preferred embodiments of the present invention will be described in detail hereinafter.

FIRST EMBODIMENT

Figure 1:
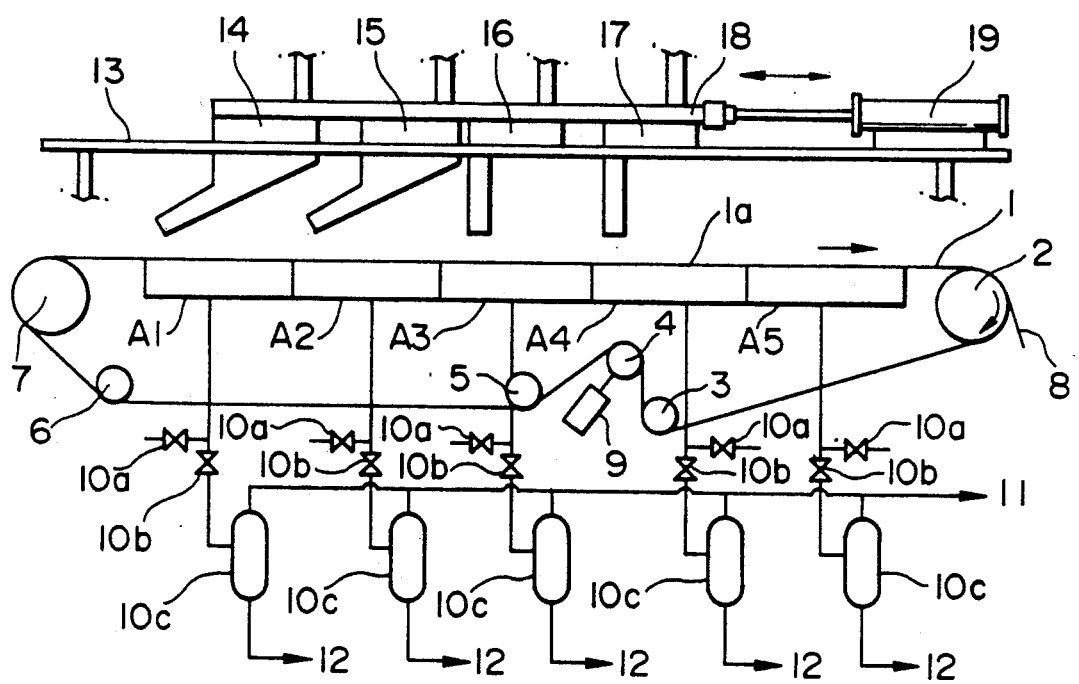
FIG. 1 is a side view of a vacuum filtration apparatus according to the first embodiment of the present invention.

FIG. 1 depicts a vacuum filtration apparatus according to a first embodiment of the present invention. In the drawing, reference numeral 1 designates an endless filter belt which conveys a slurry (a mixture of insoluble solid particles suspended in a liquid) and a cake of solid particles extracted from the slurry. The endless filter belt 1 is wound around a pair of main rollers 2 and 7 in which the main roller 2 is a drive roller which is connected to a drive mechanism (not shown) and rotates continuously. The endless filter belt 1 is also wound around a plurality of (four in the embodiment) auxiliary guide rollers 3, 4, 5, and 6. Accordingly, the endless filter belt 1 comprises an upper horizontally advancing section 1a, as can be seen in FIG. 1.

The auxiliary guide roller 4 is provided with an actuator (for example, a pneumatic cylinder) 9, so that the actuator 9 expands and retracts, thereby adjusting the position of the guide roller 4. When the actuator 9 expands, the rotation of the drive roller 2 can be transmitted to the endless filter belt 1. When the actuator 9 retracts, the rotation of the drive roller 2 cannot be transmitted to the endless filter belt 1. Accordingly, the endless belt 1 can be advanced intermittently.

In the vicinity of the drive roller 2, a scraper 8 is provided for scraping the cake of particles off the endless filter belt 1.

Under the upper horizontally advancing section 1a of the endless filter belt 1, five vacuum chambers A1 to A5 are fixedly disposed in such a manner that the upper horizontally advancing section 1a is in contact with the vacuum chambers A1 to A5. The vacuum chambers A1 to A5 are aligned along the endless filter belt 1. Each of the vacuum chambers A1 to A5 is provided independent of the other vacuum chambers. Each of the vacuum chambers A1 to A5 is connected to a first control valve 10a and a second control valve 10b. Each of the vacuum chambers A1 to A5 is connected to a reservoir 10c via the second control valve 10b, and all the reservoirs 10c are connected to a vacuum pump 11. Each of the reservoirs 10c is connected to a liquid pump 12 for accumulating water from the slurry.

When the first control valve 10a is open, the corresponding vacuum chamber is filled with air. When the first control valve 10a is closed and the second control valve 10b is open, the corresponding vacuum chamber is evacuated and draws moisture or water from the slurry on the horizontally advancing section 1a of the endless filter belt 1.

The upper horizontally advancing section 1a of the endless filter belt 1 is classified into five subsections each of equal length along the direction of advance of the endless filter belt, i.e., a first cake-formation subsection, a second cake-formation subsection, a first washing subsection, a second washing subsection, and a dehydration subsection. These subsections are respectively determined by the vacuum chambers A1 to A5.

A guide frame 13 is disposed above the upper horizontally advancing section 1a of the endless filter belt 1. An actuator (e.g., a pneumatic cylinder) 19 is mounted on the guide frame 13. The axis of the cylinder 19 is disposed along the direction of advance of the endless filter belt 1. At the distal end of the piston rod of the cylinder 19, an elongated coupling bar 18 is attached. Suspended from the coupling bar 18, are a first slurry feeder 14, a second slurry feeder 15, a first water feeder 16, and a second water feeder 17 which are disposed along the direction of advance of the endless filter belt 1. The feeders 14-17 slidable along the guide frame can be reciprocated along with the piston rod of the cylinder 19.

The first and second slurry feeders 14 and 15 feed slurry onto the endless filter belt 1. The first water feeder 16 feeds a secondary filtered water which passed through the second washing subsection and was then recirculated. The second water feeder 17 feeds fresh water, for example, water from an outside water line. Each of the feeders 14-17 is tubular, rather than a spray nozzle. Therefore, it is unlikely that one or more of the feeders will clog.

Figure 2:
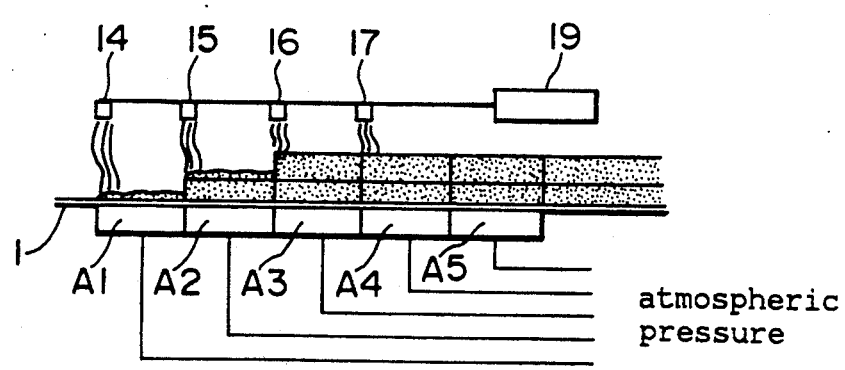
FIG. 2 is a simplified view of the filtration apparatus in FIG. 1, in which the endless filter belt advances by one subsection.

When the piston rod of the cylinder 19 is extended, as shown in FIGS. 1 and 2, the first slurry feeder 14 is disposed above the first cake-formation subsection (above the vacuum chamber A1); the second slurry feeder 15 is disposed above the second cake-formation subsection (above the vacuum chamber A2); the first water feeder 16 is disposed above the first washing subsection (above the vacuum chamber A3); and the second water feeder 17 is disposed above the second washing subsection (above the vacuum chamber A4).

Figure 3:
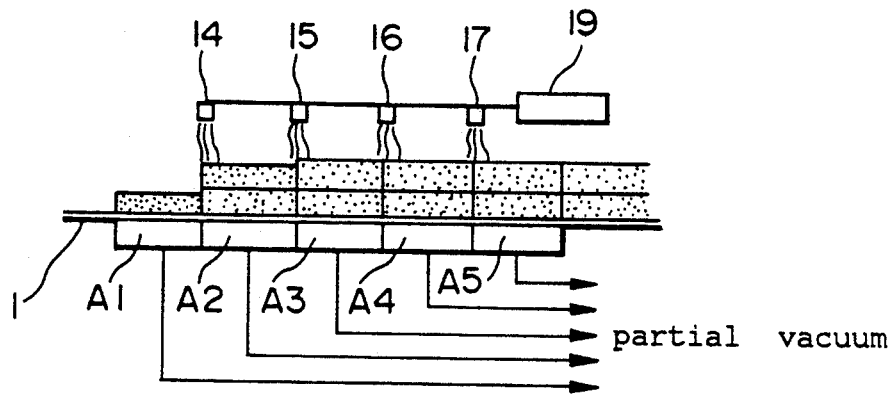
FIG. 3 is a simplified view of the filtration apparatus in FIG. 1, in which the slurry feeders and the water feeders are moved to the right by one subsection of the endless filter belt.

When the piston rod of the cylinder 19 is retracted, as shown in FIG. 3, the first slurry feeder 14 is disposed above the boundary between the first cake-formation subsection (above the vacuum chamber A1) and the second cake-formation subsection (above the vacuum chamber A2); the second slurry feeder 15 is disposed above the boundary between the second cake-formation subsection and the first washing subsection (above the vacuum chamber A3); the first water feeder 16 is disposed above the boundary between the first washing subsection and the second washing subsection (above the vacuum chamber A4); and the second water feeder 17 is disposed above the boundary between the second washing subsection and the dehydration subsection (above the vacuum chamber A5).

By using the above-described structure, vacuum filtration is accomplished as follows. From a state shown in FIG. 4, the vacuum suction of all the vacuum chambers A1 to A5 is first stopped. In this state, the piston rod of the cylinder 19 is maintained in the extended position.

Next, as shown in FIG. 2, the upper horizontally advancing section 1a of the endless filter belt 1 is quickly advanced (to the right in the drawings) by the length of the subsections and then stopped by means of activating and deactivating the aforementioned actuator 9. As the upper horizontally advancing section 1a advances, as shown in FIG. 2, the first slurry feeder 14 feeds the slurry onto the first cake-formation subsection on the vacuum chamber A1; the second slurry feeder 15 feeds the slurry onto the second cake-formation subsection on the vacuum chamber A2; the first water feeder 16 feeds the secondary filtered water onto the first washing subsection on the vacuum chamber A3; and the second water feeder 17 feeds fresh water onto the second washing subsection on the vacuum chamber A4.

More specifically, a first layer of the cake of particles is already formed on the second cake-formation subsection on the vacuum chamber A2. The second slurry feeder 15 feeds the slurry onto the first cake layer on the second cake-formation subsection. In addition, a two-layered cake is already formed on the first and second washing subsections on the vacuum chambers A3 and A4. The secondary filtered water is fed on and washes the cake on the first washing subsection on the vacuum chamber A3, and fresh water is fed on and washes the cake on the second washing subsection on the vacuum chamber A4 which has already been washed by the secondary filtered water.

Once the advancement of the endless filter belt 1 is stopped, the interior pressure in all the vacuum chambers A1 to A5 begins to decrease by means of the closing of the first control valve 10a and the opening of the second control valve 10b. At the same time, the piston rod of the cylinder 19 commences to slowly retract by the length of the subsections. As the piston rod of the cylinder 19 slowly retracts, the slurry feeders 14 and 15 and the water feeders 16 and 17 are also slowly moved by the length of the subsections (to the right in the drawings), as can be seen in FIG. 3.

As a result, the first layer of the cake of particles is formed on the first cake-formation subsection on the vacuum chamber A1 as shown in FIG. 3. In addition, the second layer of the cake is formed on the first layer which has already been formed on the second cake-formation subsection on the vacuum chamber A2. On the first washing subsection on the vacuum chamber A3, the secondary filtered water is supplied to wash impurities out of the two-layered cake. On the second washing subsection on the vacuum chamber A4, fresh water is supplied to further wash impurities from the two-layered cake. At the dehydration subsection on the vacuum chamber A5, the water included in the washed cake is drawn off by the vacuum, thereby dehydrating the cake.

Figure 4:
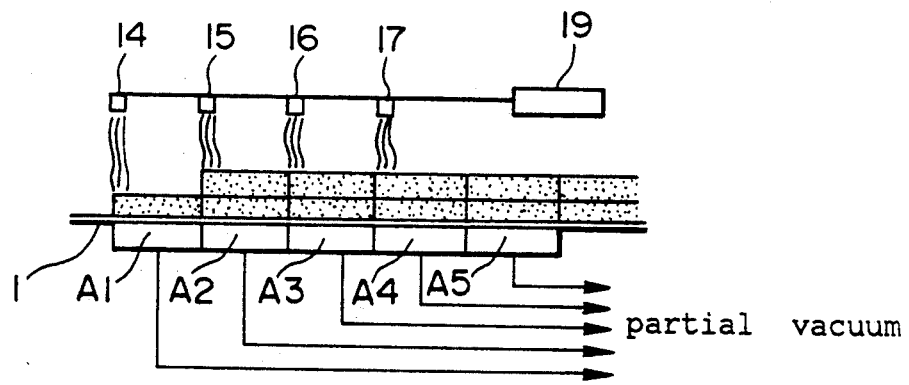
FIG. 4 is a simplified view of the filtration apparatus in FIG. 1, in which the slurry feeders and the water feeders are moved to the left by one subsection of the endless filter belt.

From the state shown in FIG. 3, the piston rod of the cylinder 19 is quickly extended by the length of the subsections to the state shown in FIG. 4. Thus, the slurry feeders 14 and 15 and the water feeders 16 and 17 are also quickly moved along with the piston rod by the length of the subsections (to the left in the drawings).

Accordingly, the formation of the first layer of the cake is completed on the first cake-formation subsection, while the formation of the second layer of the cake is completed on the second cake-formation subsection. In addition, on the first and second washing subsections, the washing of the cake is accomplished while the dehydration of the cake is continued on the dehydration subsection.

When the state of the cake-formation shown in FIG. 4 is reached, the process is returned to the aforementioned initial stage. That is, from the state shown in FIG. 4, the vacuum suction of all the vacuum chambers A1 to A5 is first stopped, and then the upper horizontally advancing section 1a of the endless filter belt 1 is quickly advanced (to the right in the drawings) by the length of the subsections and then stopped by means of the activation and deactivation of the aforementioned actuator 9.

In summary, on the endless filter belt 1, the two-layered cake of the slurry is formed by means of the slurry feeders 14 and 15. By virtue of the water feeders 16 and 17, the cake is progressively washed. Furthermore, the cake is dehydrated and dried in the dehydration subsection. The cake is then scraped from the endless filter belt 1 by means of the scraper 8 and accumulated as a final product.

Next, an example of use of the vacuum filtration apparatus will be described.

In the example, the substantial width of the endless filter belt was 800 mm. The length of each of the vacuum chambers A1 to A5 was 700 mm. Accordingly, the pitch of the feeding openings of the feeders 14, 15, 16, and 17 was 700 mm. The stroke of the piston rod of the cylinder was also 700 mm.

The slurry was a mixture of water, magnetic iron oxide at 15% by weight, and caustic soda at 12% by weight. The average size of the particles of the magnetic iron oxide was 20 μm. The slurry was fed from each of the two feeders 14 and 15 at 3000 kg/h.

The water was fed from the two feeders 16 and 17 at 600 l/h respectively. When evacuated, the vacuum chambers A1 to A5 had a pressure of 400 mmHg in each chamber.

The endless filter belt 1 was stopped for 15 seconds and then advanced for 5 seconds. In addition, the feeders 14, 15, 16, and 17 were moved along with the piston rod of the cylinder 19 to the right in the drawings for 12 seconds. The feeders 14, 15, 16, and 17 were moved along with the piston rod of the cylinder 19 (to the left in the drawings) for 3 seconds.

Accordingly, a dehydrated cake of the magnetic iron oxide was obtained at the rate of 448 kg/h. The moisture in the dehydrated cake was 43%, and the density of the caustic soda was 0.12% by weight.

In contrast, when the feeders 14, 15, 16, and 17 were fixed during the drive of the endless belt 1, in the obtained dehydrated cake, the moisture was 54%, and the density of the caustic soda was 0.37% by weight.

These results indicate that the present invention can contribute to increasing the purity of the obtained cake. That is, in the case in which the feeders 14, 15, 16, and 17 were fixed, the layers of the cake were not formed uniformly; thus, the dehydration was not uniform, and the washing water could not flush through the cake uniformly.

In contrast, in the present invention, the slurry is uniformly and constantly fed onto the horizontally advancing section 1a of the endless filter belt 1. Accordingly, the filtration can be achieved uniformly and the filtration rate is enhanced. In addition, the washing water for the cake uniformly passes through the cake so that the washing of the cake can be achieved uniformly and the washing rate is enhanced.

SECOND EMBODIMENT

Figure 5:
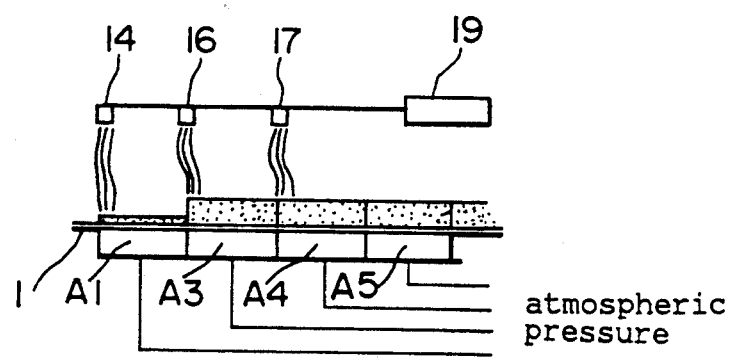
FIG. 5 is a simplified view of a filtration apparatus according to a second embodiment of the present invention, in which the endless filter belt advances by one subsection.
Figure 6:
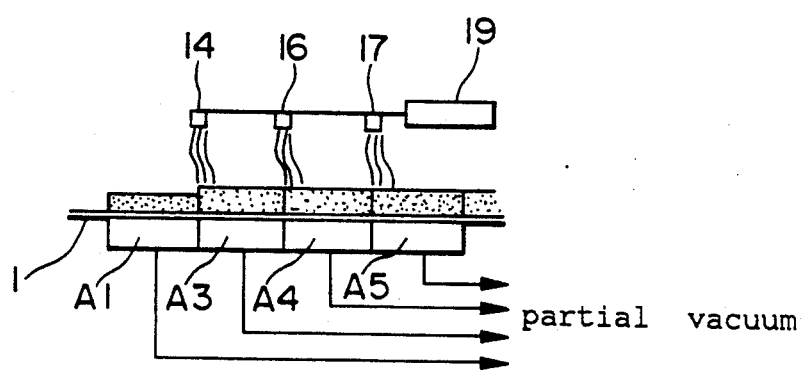
FIG. 6 is a simplified view of the filtration apparatus in FIG. 5, in which the slurry feeder and the water feeders are moved to the right by one subsection of the endless filter belt.
Figure 7:
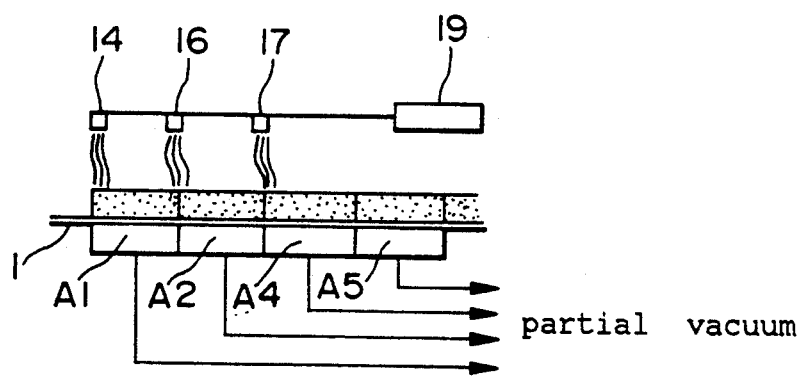
FIG. 7 is a simplified view of the filtration apparatus in FIG. 5, in which the slurry feeder and the water feeders are moved to the left by one subsection.
Figure 11:
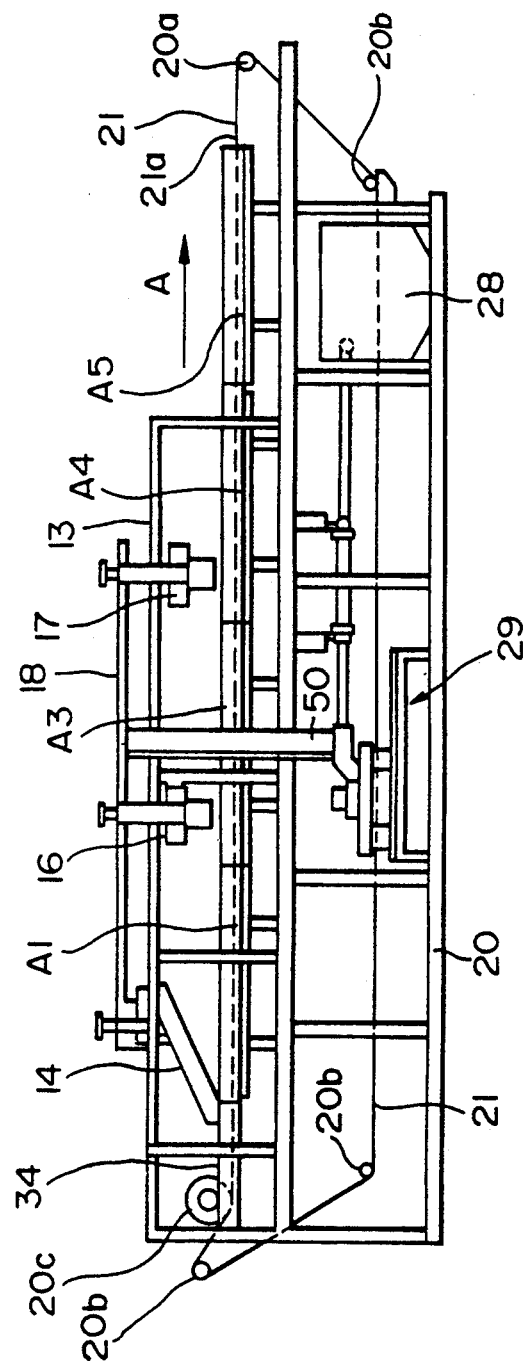
FIG. 11 is a side view of a vacuum filtration apparatus according to a fourth embodiment of the present invention.
Figure 12:
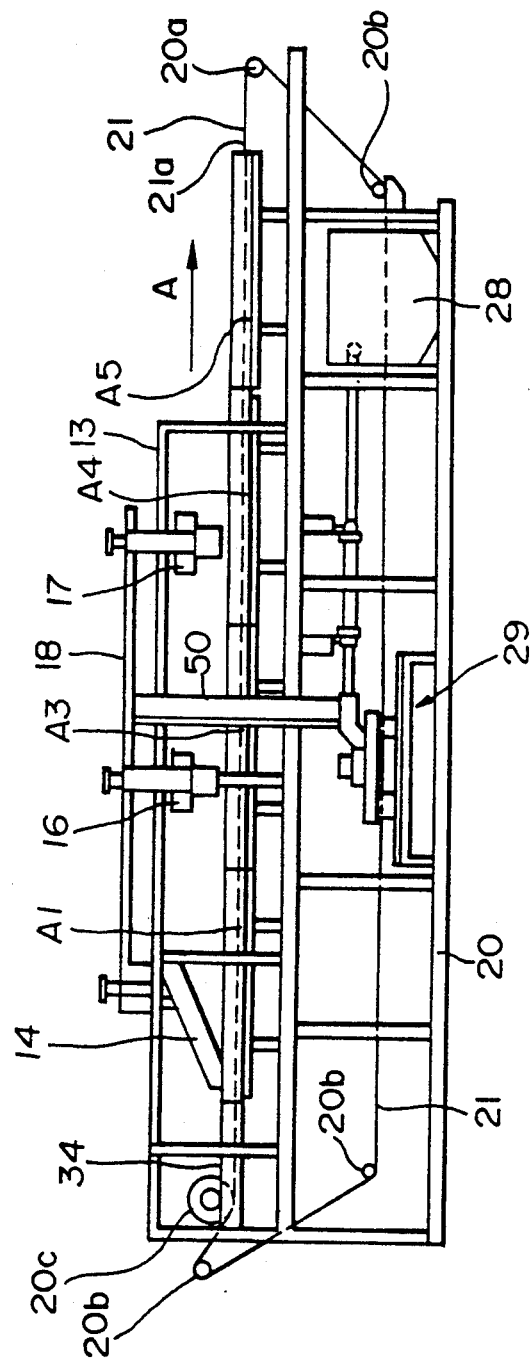
FIG. 12 is a side view of the vacuum filtration apparatus in FIG. 11, in which the slurry feeder and the water feeders are moved slightly to the right.
Figure 13:
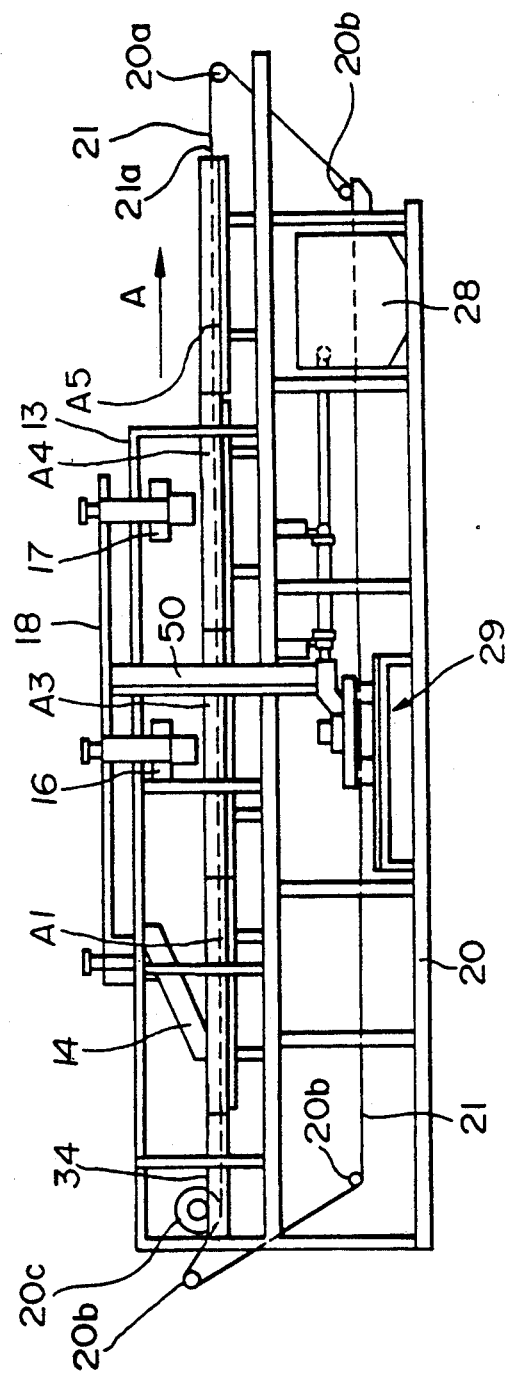
FIG. 13 is a side view of the vacuum filtration apparatus in FIG. 11, in which the slurry feeder and the water feeders are moved to the right by one stroke.
Figure 14:
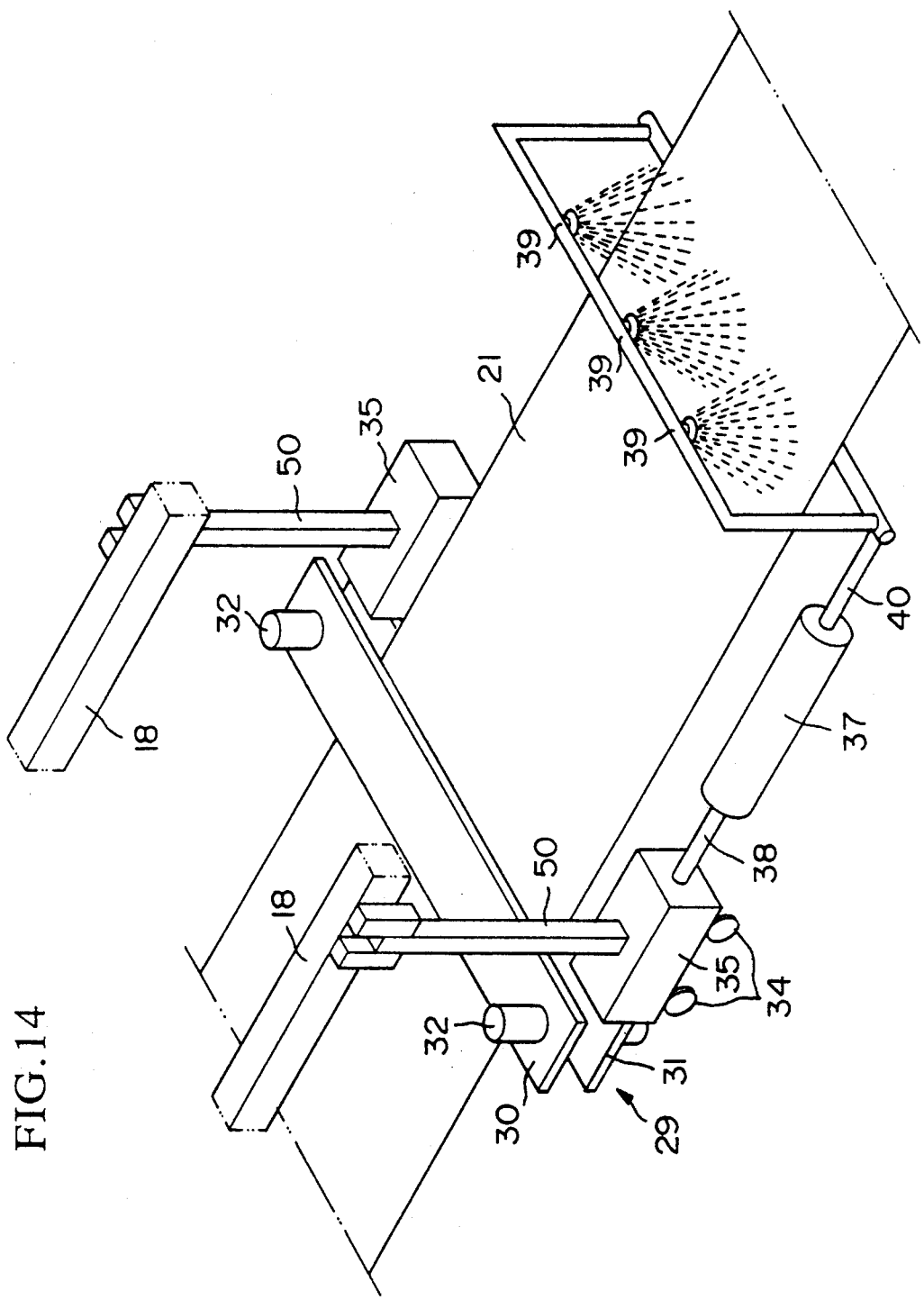
FIG. 14 is a perspective view of the vacuum filtration apparatus in FIG. 11, showing a belt advancing section.

FIGS. 5 to 7 depict a second embodiment of the present invention. In the embodiment, only one slurry feeder 14 is provided. The four vacuum chambers A1, A3, A4, and A5 are provided in that order. The operation of the second embodiment is the same as in the first embodiment. Thus, the cake-formation subsection, the first washing subsection, the second washing subsection, and the dehydration subsection are provided on the horizontally advancing section 1a of the endless filter belt 1. Accordingly, one layered cake can be obtained.

As can be understood from the preceding first and second embodiments, the number of the slurry feeders and the water feeders may be selected in light of the preferable purity of the obtained cake and the rate of filtration determined by the slurry particles.

In the above embodiments, one-layered or two-layered cakes can be obtained. However, the present invention is not limited to the above embodiments. It is usually possible to form cakes of up to four layers. The number of cake layers is dependent on the filtration properties of the particles. Experientially, if the ratio between the mass of the washing water and the mass of the particles is 1, the duration of washing may be substantially shorter than the duration of the cake-formation. Accordingly, it is advantageous to increase the number of layers of the cake as much as possible.

THIRD EMBODIMENT

Next, with reference to FIGS. 8 through 10, a third embodiment of the present invention will be described.

In the drawings, reference numeral 20 designates a frame of a vacuum filtration apparatus according to the third embodiment. At suitable positions along the frame 20, a plurality of guide rollers 20a, 20b, and 20c are attached so as to be freely rotatable, and an endless filter belt 21 is wound around the guide rollers 20a, 20b, and 20c in such a manner that the endless filter belt 21 comprises an upper horizontally advancing section 21a between the guide rollers 20a and 20c. As will be described in detail later, the horizontally advancing section 21a of the endless filter belt 21 can be advanced in one direction along arrow A in FIG. 8 intermittently and at a constant pitch.

Under the upper horizontally advancing section 21a of the endless filter belt 21, four vacuum chambers A1, A3, A4, and A5 are fixedly disposed in such a manner that the upper horizontally advancing section 21a is contact with the vacuum chambers A1, A3, A4, and A5. The vacuum chambers A1, A3, A4, and A5 are aligned along the endless filter belt 1.

Each of the vacuum chambers A1, A3, A4, and A5 is connected to the valve mechanism in a manner similar to that in the first embodiment. Accordingly, the vacuum chambers may be alternately filled with air or may be evacuated.

On the upper horizontally advancing section 21a of the endless filter belt 21, a slurry is uniformly fed from a slurry feeder 14. Once the slurry arrives at the first vacuum chamber A1 by the movement of the endless filter belt 21 for a certain distance, all the vacuum chambers A1, A3, A4, and A5 are evacuated, and at the same time, the endless filter belt 21 is stopped. Thus, the endless filter belt 21 is sucked to the upper surfaces of all the vacuum chambers A1, A3, A4, and A5. By virtue of the partial vacuum (more exactly, by decreasing the pressure) in the vacuum chamber A1, the moisture or water contained in the slurry is drawn from the slurry on the upper horizontally advancing section 21a of the endless filter belt 21 through the upper horizontally advancing section 21a, and the water is subsequently drained away via tubes (not shown).

After filtration has been conducted for a certain period, the interior pressure in the vacuum chamber is equalized with atmospheric pressure, whereby the endless filter belt 21 is advanced being released from the vacuum chambers A1, A3, A4, and A5. The slurry is then again fed from the slurry feeder 14. Consequently, as the interiors of the vacuum chambers alternate between a partial vacuum and atmospheric pressure, the endless filter belt 21 stops and advances intermittently. The slurry fed from the slurry feeder 14 onto the upper horizontally advancing section 21a of the endless belt 21 may be dehydrated continuously, thereby creating a cake of the particles on the upper horizontally advancing section 21a.

If necessary, the cake is washed by water fed from water feeders 16 and 17, and then dehydrated again. The finished cake is scraped from the endless belt 21 by means of a scraping mechanism like the scraper 8 in the first embodiment, and is accumulated as a final product. The endless belt 21 from which the cake has been scraped is then cleaned in a cleaning device 28.

In the present embodiment, the above structure is the same as in the conventional technique. The present embodiment is characterized in that the endless filter belt 21 is intermittently advanced by a constant pitch by means of a belt advancing device 29.

Next, the belt advancing device 29 will be described in detail with reference to FIGS. 9 and 10.

As shown in FIGS. 9 and 10, a pair of sandwiching members 30 and 31 of an elongated bar shape are disposed perpendicular to the direction of movement of the endless filter belt 21. The endless filter belt 21 intermediates between the upper sandwiching member 30 and the lower sandwiching member 31. The length of the sandwiching members 30 and 31 along the lengthwise direction thereof is longer than the width of the endless filter belt 21.

A pair of actuators 32 (e.g., pneumatic cylinders) are mounted on both ends of the upper sandwiching member 30. The distal ends of the piston rods 33 of the actuators 32 are coupled with both ends of the lower sandwiching member 31. Accordingly, the lower sandwiching member 31 can be raised and lowered in relation to the upper sandwiching member 30. That is to say, if the lower sandwiching member 30 is raised upward, the endless filter belt 21 can be sandwiched between the sandwiching members 30 and 31.

Both ends of the upper sandwiching member 30 are mounted on vehicles 35, respectively. At the lower portion of the frame 20 of the vacuum filtration apparatus, a pair of supporting tracks 36 are fixedly located along the advancement direction of the endless filter belt 21. Each of the vehicles 35 has a pair of wheels 34 which rotatably move along the corresponding supporting track 36.

An actuator 37 (e.g., a pneumatic cylinder) is mounted on the lower portion of the frame of the vacuum filtration apparatus in such a manner that the piston rod 38 of the actuator 37 is disposed along the advancement direction of the endless filter belt 21 and toward the upper sandwiching member 30. The distal end of the piston rod 38 of the actuator 37 is coupled with the lengthwise center portion of the upper sandwiching member 30. The extension and the retraction of the piston rod 38 cause the reciprocating movement of the vehicles 35 along the supporting tracks 36.

Before advancement of the endless filter belt 21, both of the upper and lower sandwiching members 30 and 31 are located at initial position B illustrated by the dotted lines. In this state, by activating the actuator 32, the lower sandwiching member 31 is so raised that the endless filter belt 21 is sandwiched and is tightly held between the sandwiching members 30 and 31. The piston rod 38 of the actuator 37 is then extended. Accordingly, the upper and lower sandwiching members 30 and 31 holding the endless filter belt 21 therebetween is quickly advanced to the left (in the direction of arrow C) in the drawing. As the sandwiching members 30 and 31 are stopped at the position illustrated by the solid lines, the endless filter belt 21 is also moved from the initial position B and stopped where the sandwiching members are illustrated by solid lines.

The lower sandwiching member 31 is then lowered at the position where the sandwiching members are illustrated by solid lines, thereby releasing the endless filter belt 21. The sandwiching members 30 and 31 are returned to the initial position B at a low speed which is suitable for the filtration rate, hold the endless belt 21 therebetween again, and move the endless belt 21 to the position where the sandwiching members are illustrated by solid lines. This cycle continues so that the endless filter belt 21 is intermittently advanced by a constant pitch.

The above-described intermittent movement of the endless filter belt 21 is synchronized with the above-described switching of the vacuum chambers A1, A3, A4, and A5 between atmospheric pressure and partial vacuum. That is, when the endless filter belt 21 is advanced, the interior of the vacuum chambers A1, A3, A4, and A5 is at atmospheric pressure. When the endless filter belt 21 is stopped, the interior of the vacuum chambers A1, A3, A4, and A5 is under a partial vacuum, so that the endless filter belt 21 is sucked to the vacuum chambers A1, A3, A4, and A5, and the moisture or water of the slurry is removed from the slurry.

Accordingly, the pitch of the intermittent movement of the endless filter belt 21 is determined by the stroke of the piston rod 38 of the actuator 37. The duration of the stopping of the endless belt 21 is selected in light of the preferred dehydrating and filtrating duration.

The aforementioned cleaning device 28 comprises an enclosure through which the endless filter belt 21 passes, and a water injection nozzle 39 disposed within the enclosure. The enclosure prevents the water sprayed from the injection nozzle 39 from splashing out. The water from the injection nozzle 39 cleanses the endless filter belt 21 after the scraping of the cake. The injection nozzle 39 is located at a distal end of a water supply pipe 40. The water supply pipe 40 is coupled with the piston rod 38 of the actuator 37, so that the injection nozzle 39 can be moved along the endless filter belt 21 due to the extension and retraction of the piston rod 38.

Consequently, when the belt 21 is advanced quickly in the direction of arrow A in FIG. 9, the injection nozzle 39 is also moved quickly by the piston rod 38 of the actuator 37. When the piston rod 38 is retracted and thus the injection nozzle 39 is returned in the direction of arrow D, the endless filter belt 21 is stopped. Accordingly, if the duration of the stopping of the endless filter belt 21 is sufficiently long, the piston rod 38 can be retracted so slowly that the cleansing of the endless filter belt 21 may be accomplished sufficiently within the duration of the stroke of the piston rod 38.

With such a structure, the cleansing water can be supplied continuously. Accordingly, it is unnecessary to provide a device, for example, a electromagnetic switching valve for switching the cleansing water supply on and off.

In addition, according to the third embodiment, the endless filter belt can always be advanced intermittently in one direction by a constant pitch without using a back-movement prevent mechanism of the endless filter belt. In addition, since the endless filter belt is not received any initial tension for driving the endless filter belt unlike in the first and second embodiment, it is possible to prevent undue stress on the endless filter belt, thereby increasing its service life.

FOURTH EMBODIMENT

Next, with reference to FIGS. 11 through 14, a fourth embodiment of the present invention will be described.

The fourth embodiment is an improvement of the third embodiment in view of the second embodiment. In the following description, like reference symbols are attached to like structural elements of the third embodiment, and the description of the elements already described will not be repeated.

The fourth embodiment is characterized in that the slurry feeder 14 and the water feeders 16 and 17 are moved in synchrony with the movement of the filter endless belt 21. As shown in FIGS. 11-14, the slurry feeder 14, the first water feeder 16, and the second water feeder 17 are suspended from a pair of elongated coupling bars 18. Each of the coupling bars 18 is connected to the upper sandwiching member 30 of the belt advancing device 29 through a connecting bar 50. The feeders 14, 16, and 17 are slidable along a guide frame 13 which is disposed above the upper horizontally advancing section 21a of the endless filter belt 21.

Accordingly, when the filter endless belt 21 is quickly advanced along with the belt advancing device 29, the slurry feeder 14, the first water feeder 16, and the second water feeder 17 are also quickly moved by the length of the stroke of the piston rod 38 of the actuator 37 (to the left in the drawings). That is, the feeders 14, 16, and 17 are moved quickly from the state shown in FIG. 13 to the state shown in FIG. 11 through the state shown in FIG. 12.

Then, the belt advancing device 29 releases the endless filter belt 21, and returns to the initial position at a low speed which is suitable for the filtration rate.

As the piston rod 38 of the actuator 37 slowly retracts, the slurry feeder 14 and the water feeders 16 and 17 are also slowly moved by the length of stroke of the piston rod 38 of the actuator 37 (to the right of the drawing). That is, the feeders 14, 16, and 17 are moved slowly from the state shown in FIG. 11 to the state shown in FIG. 13 through the state shown in FIG. 12.

This cycle continues so that the endless filter belt 21 is intermittently advanced by a constant pitch. In addition, when the endless filter belt 21 stops, the slurry feeder 14 uniformly feeds the slurry onto the cake-formation subsection (above the vacuum chamber A1); the first water feeder 16 uniformly feeds the secondary filtrated water onto the cake formed on the first washing subsection (above the vacuum chamber A3); the second water feeder 17 uniformly feeds the fresh water onto the cake on the second washing subsection (above the vacuum chamber A4); and the cake on the dehydration subsection (above the vacuum chamber A5) is dehydrated and dried uniformly.

In other words, the fourth embodiment realizes the same process as in the second embodiment.

Although preferred embodiments of the present invention have been disclosed for illustrative purpose, those skilled in the art will appreciate that various modifications, additions, and substitutions are possible, without departing from the scope and spirit of the invention as stated in the accompanying claims.

What is claimed is:

1. A vacuum filtration apparatus comprising:
   at least one vacuum chamber fixedly secured at a predetermined position, the vacuum chamber opening upward, and the interior of the vacuum chamber alternating between a partial vacuum and atmospheric pressure; and
   an endless filter belt having a generally horizontal section disposed generally horizontally above the vacuum chamber, a mixture of a liquid and solid particles suspended therein being fed onto the generally horizontal section of the endless filter belt, the endless filter belt having a belt advancing device to intermittently advance said belt by a predetermined length, the vacuum chamber being under a vacuum so as to draw the liquid constituent from the mixture on the generally horizontal section of the endless filter belt when the endless filter belt is stopped, wherein the endless filter belt conveys a cake of the solid particles extracted from the mixture, and then a washing liquid being fed onto the cake of the solid particles on the generally horizontal section of the endless filter belt to wash the cake of the solid particles, and then the washing liquid is drawn off by the suction of the vacuum chamber through the endless filter belt, thereby obtaining purified a cake of the solid particles,
   the vacuum filtration apparatus further comprising:
   at least one mixture feeder for feeding the mixture onto the generally horizontal section of the endless filter belt;
   at least one washing liquid feeder for feeding the washing liquid onto the cake of the solid particles on the generally horizontal section of the endless filter belt; and
   said belt advancing device being connected to a reciprocating means for reciprocating the mixture feeder and the washing liquid feeder along the endless filter belt by the length of the intermittent advancement of the endless filter belt.

2. A vacuum filtration apparatus according to claim 1, comprising a first washing liquid feeder and a second washing liquid feeder, the second washing liquid feeder being disposed subsequent to the first washing liquid feeder in the direction of the movement of the endless filter belt, the second washing liquid feeder feeding a fresh liquid onto the cake of the solid particles for washing the solid particles, the first washing liquid feeder feeding a secondary liquid which has already been utilized for washing the solid particles onto the cake of the solid particles for washing the solid particles.

3. A vacuum filtration apparatus according to claim 1, wherein the belt advancing device holds on to the endless filter belt while the belt advancing device advances the endless filter belt, and the belt advancing device releases the endless filter belt when the endless filter belt is stopped, wherein the mixture feeder and the washing liquid feeder can uniformly feed the slurry or the washing liquid onto the endless filter belt while the endless belt is advanced, and wherein the mixture feeder and the washing liquid feeder can be returned to initial positions from where the feeding of the mixture or the washing water commences when the endless filter belt is stopped.

4. A vacuum filtration apparatus according to claim 1, further comprising a cleaning device having at least one spraying means which cleanses the endless filter belt after generally removing the cake of the solid particles from the endless filter belt, the spraying means being driven by the belt advancing device in synchrony with the movement of the endless filter belt, thereby cleansing the endless filter belt uniformly and continuously.

5. A vacuum filtration apparatus comprising:
   at least one vacuum chamber fixedly secured at a predetermined position, the vacuum chamber opening upward, and the interior of the vacuum chamber alternating between a partial vacuum and atmospheric pressure; and
   an endless filter belt having a generally horizontal section disposed generally horizontally above the vacuum chamber, a mixture of a liquid and solid particles suspended therein being fed onto the generally horizontal section of the endless filter belt, the endless filter belt being able to intermittently advance by a predetermined length, the vacuum chamber being under a vacuum so as to draw the liquid constituent from the mixture on the generally horizontal section of the endless filter belt when the endless filter belt is stopped, wherein the endless filter felt conveys a cake of the solid particles extracted from the mixture, and then a washing liquid being fed onto the cake of the solid particles on the generally horizontal section of the endless filter belt to wash the cake of the solid particles, and then the washing liquid is drawn off by the suction of the vacuum chamber through the endless filter belt, thereby obtaining purified a cake of the solid particles, the vacuum filtration apparatus further comprising:

at least one mixture feeder for feeding the mixture onto the generally horizontal section of the endless filter belt;

at least one washing liquid feeder for feeding the washing liquid onto the cake of the solid particles on the generally horizontal section of the endless filter belt; and a reciprocating means for reciprocating the mixture feeder and the washing liquid along the endless filter belt by the length of the intermittent advancement of the endless filter belt and further comprising a belt advancing device which intermittently advances the endless filter belt, the belt advancing device being connected to said reciprocating means for reciprocating the mixture feeder and the washing liquid feeder along the endless filter belt, wherein the mixture feeder and the washing liquid feeder can be reciprocated by a length of the intermittent advancement of the endless filter belt and wherein the belt advancing device holds on to the endless filter belt while the belt advancing device advances the endless filter belt, and the belt advancing device releases the endless filter belt when the endless filter belt is stopped, wherein the mixture feeder and the washing liquid feeder can uniformly feed the slurry or the washing liquid onto the endless filter belt while the endless belt is advanced, and wherein the mixture feeder and the washing liquid feeder can be returned to initial positions from where the feeding of the mixture or the washing water commences when the endless filter belt is stopped.

6. A vacuum filtration apparatus comprising:

at least one vacuum chamber fixedly secured at a predetermined position, the vacuum chamber opening upward, and the interior of the vacuum chamber alternating between a partial vacuum and atmospheric pressure; and an endless filter belt having a generally horizontal section disposed generally horizontally above the vacuum chamber, a mixture of a liquid and solid particles suspended therein being fed onto the generally horizontal section of the endless filter belt, the endless filter belt being able to intermittently advance by a predetermined length, the vacuum chamber being under a vacuum so as to draw the liquid constituent from the mixture on the generally horizontal section of the endless filter belt when the endless filter belt is stopped, wherein the endless filter belt conveys a cake of the solid particles extracted from the mixture, and then a washing liquid being fed onto the cake of the solid particles on the generally horizontal section of the endless filter belt to wash the cake of the solid particles, and then the washing liquid being drawn off by the suction of the vacuum chamber through the endless filter belt, thereby obtaining purified a cake of the solid particles, the vacuum filtration apparatus further comprises:

at least one mixture feeder for feeding the mixture onto the generally horizontal section of the endless filter belt;

at least one washing liquid feeder for feeding the washing liquid onto the cake of the solid particles on the generally horizontal section of the endless filter belt; and a belt advancing device which intermittently advances the endless filter belt, and wherein the belt advancing device holds on to the endless filter belt while the belt advancing device advances the endless filter belt, and the belt advancing device releases the endless filter belt when the endless filter belt is stopped, and wherein the belt advancing device comprises upper and lower sandwiching members for sandwiching the endless filter belt, and driving means for driving the sandwiching members to reciprocate along the endless filter belt, thereby intermittently advancing the endless filter belt held between the sandwiching members.

7. A vacuum filtration apparatus according to claim 6, further comprising a cleaning device having at least one spraying means which cleanses the endless filter belt after generally removing the cake of the solid particles from the endless filter belt, the spraying means being driven by the belt advancing device in synchrony with the movement of the endless filter belt, thereby cleansing the endless filter belt uniformly and continuously.

* * * * *